United States Patent [19]

Moslehi et al.

[11] Patent Number: 5,326,170
[45] Date of Patent: Jul. 5, 1994

[54] WIRELESS TEMPERATURE CALIBRATION DEVICE AND METHOD

[75] Inventors: Mehrdad M. Moslehi; Habib Najm; Lino A. Velo, all of Dallas, Tex.

[73] Assignee: Texas Instruments, Incorporated, Dallas, Tex.

[21] Appl. No.: 115,920

[22] Filed: Sep. 1, 1993

Related U.S. Application Data

[63] Continuation of Ser. No. 928,564, Aug. 11, 1992, Pat. No. 5,265,957.

[51] Int. Cl.$^5$ .......................... G01K 15/00; G01J 5/54
[52] U.S. Cl. ...................................... 374/2; 250/252.1
[58] Field of Search .......................... 374/1, 2, 17, 161; 252/252.1

[56] References Cited

U.S. PATENT DOCUMENTS

| | | | |
|---|---|---|---|
| 4,309,901 | 1/1982 | Rolinski et al. | 374/1 X |
| 4,623,263 | 11/1986 | Barberi et al. | 374/25 |
| 4,627,740 | 12/1986 | Jerde et al. | 374/25 X |
| 4,761,539 | 8/1988 | Carmean | 374/1 |
| 4,956,538 | 9/1990 | Moslehi . | |
| 4,984,902 | 1/1991 | Crowley et al. | 374/1 |
| 5,092,674 | 3/1992 | Brotz | 374/17 X |
| 5,102,231 | 4/1992 | Loewenstein et al. | 374/129 |
| 5,156,461 | 10/1992 | Moslehi et al. . | |
| 5,221,142 | 6/1993 | Snow | 374/161 X |
| 5,258,602 | 11/1993 | Naselli et al. | 374/2 X |
| 5,265,957 | 11/1993 | Moslehi et al. | 374/1 |

OTHER PUBLICATIONS

Dilhac et. al., "In situ interferometric measurements in a rapid thermal processor", SPIE vol. 1393 Rapid thermal and Related Processing Techniques (1990), pp. 349-353. (Oct. 2-3, 1990).

Badgwell et al., "In situ Measurement of Wafer Temperatures in a Low Pressure Chemical Vapor Deposition Furnace", IEEE Transactions on Semiconductor Manufacturing, vol. 6, No. 1, Feb. 1993, pp. 65-71.

J. M. Dilhac, C. Ganibal, N. Nolhier, and B. Rousset, "Ge Thin-film Melting Point Detection For Optical Pyrometer Calibration In A Rapid Thermal Processor", 8127 Review of Scientific Instruments 63(1992) Jan., No. 1, New York, US, pp. 188-190.

*Primary Examiner*—Daniel M. Yasich
*Attorney, Agent, or Firm*—Jacqueline J. Garner; William E. Hiller; Richard L. Donaldson

[57] ABSTRACT

A method for calibrating at least one temperature sensor. A wafer (30) having calibration structures of a material having a melting point in the range of 150° to 1150° C. is provided. The temperature sensor is operable to detect a temperature dependent characteristic of the wafer and output a signal corresponding to the temperature depending characteristic. The power input is selectively varied and the wafer temperature is ramped for a calibration run. A wafer characteristic, such as wafer reflectance, radiance, or emissivity, is monitored. A first step change in the wafer characteristic corresponding to a wafer temperature equal to the melting point of the calibration structures is detected and a set of calibration parameters for each temperature sensor being calibrated is calculated.

17 Claims, 10 Drawing Sheets

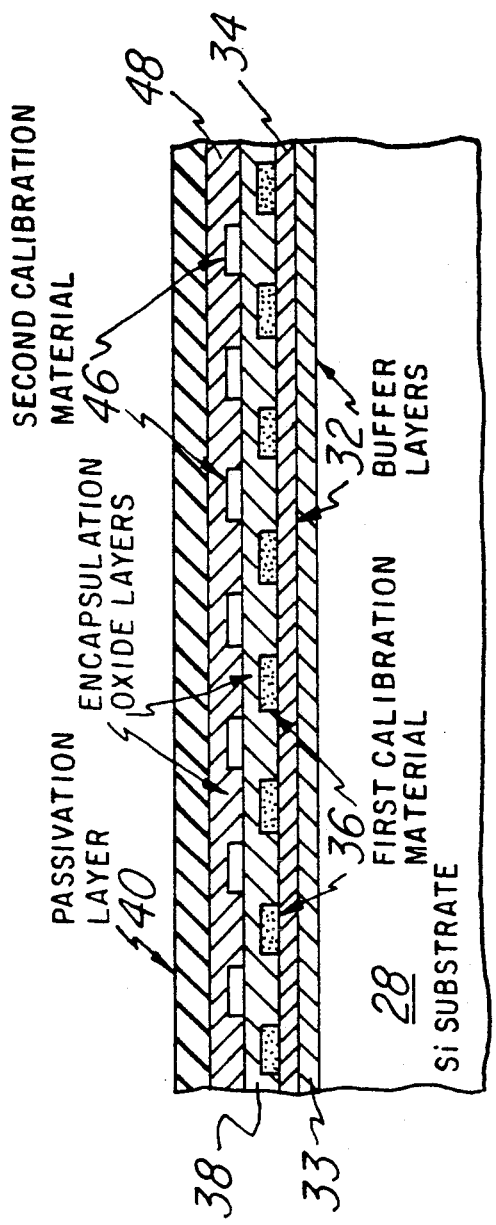
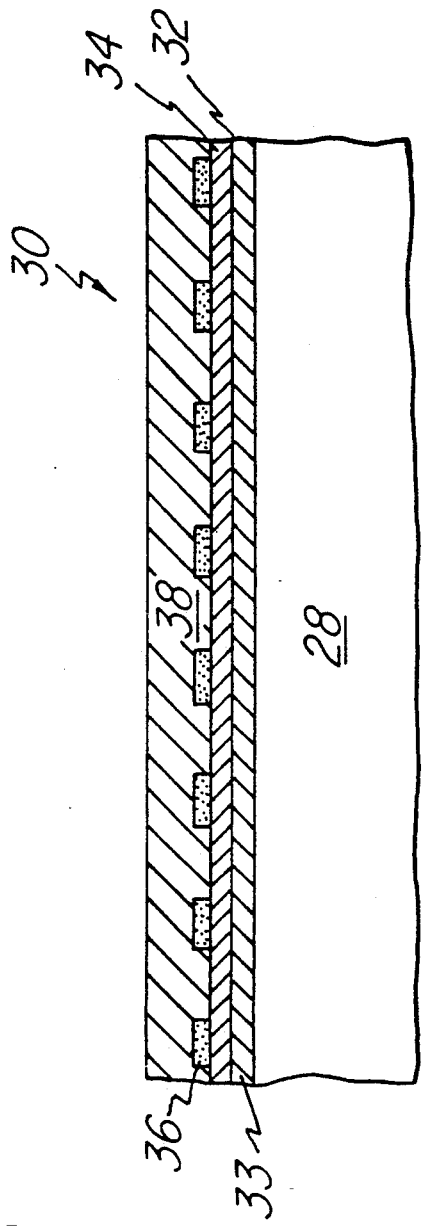

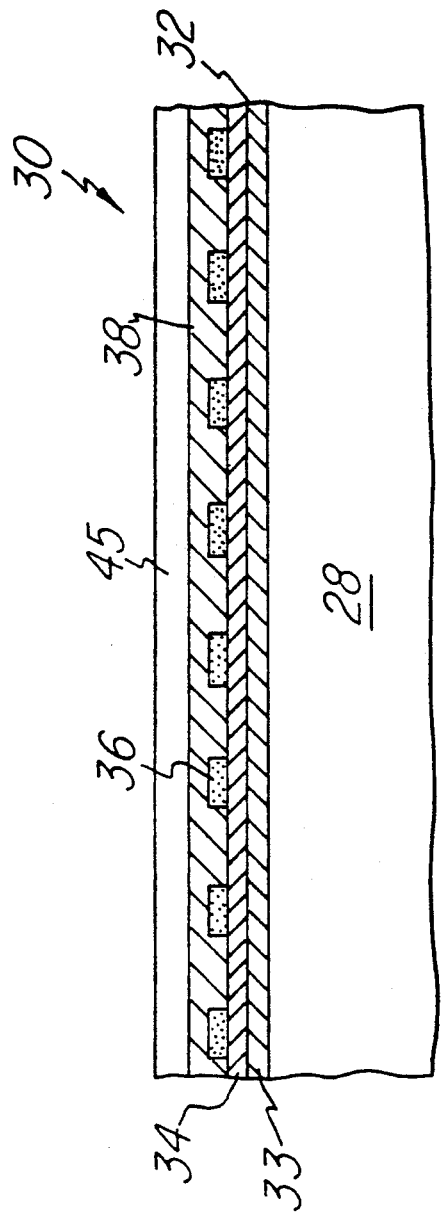
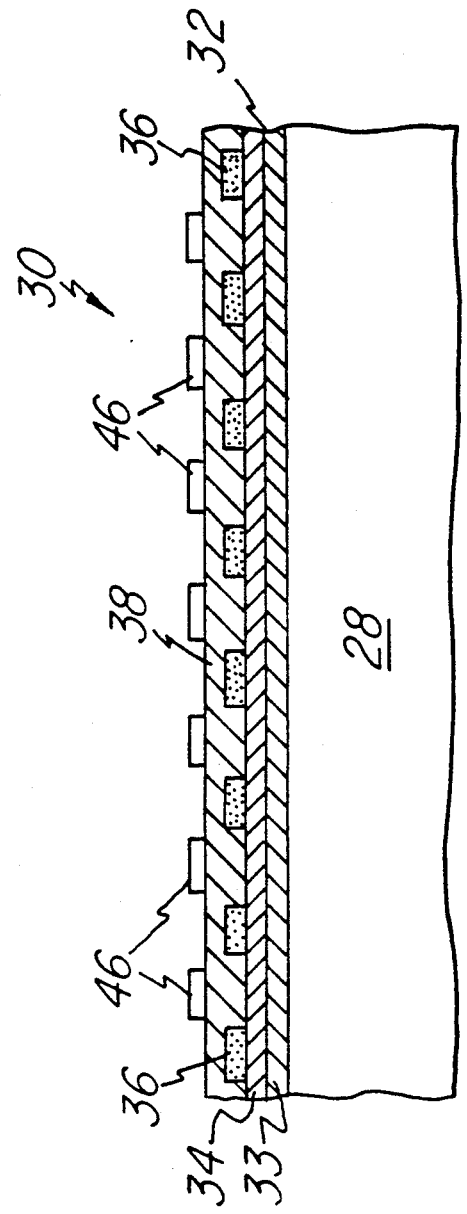

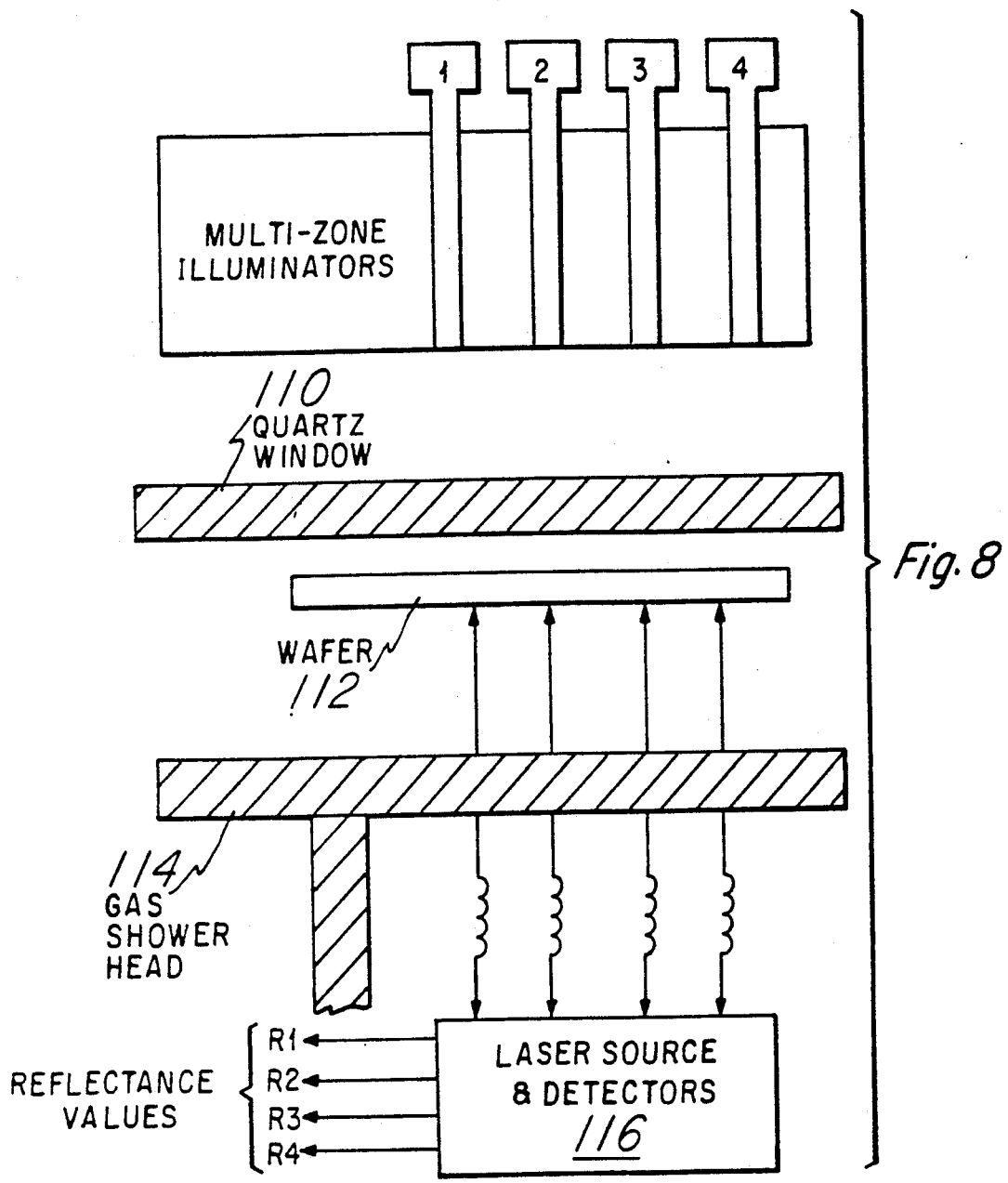

WIRELESS TEMPERATURE CALIBRATION DEVICE AND METHOD

This is a continuation, division, of application Ser. No. 07/928,564, filed Aug. 11, 1992, now U.S. Pat. No. 5,265,957 issued Nov. 30, 1993.

NOTICE

Copyright, *M* Texas Instruments Incorporated 1992. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

BACKGROUND OF THE INVENTION

1. Field of the Invention

This invention generally relates to sensor technology and more specifically to wireless temperature calibration devices and methods for semiconductor device thermal fabrication processes.

2. Description of the Related Art

Numerous semiconductor device thermal fabrication processes employ temperature sensors which require calibration against reliable and repeatable standards. An important group of device fabrication processes is rapid thermal processing (RTP). Most of the RTP reactors employ non-contact pyrometry for wafer temperature measurement and control, as shown in FIG. 1. However, the accuracy and repeatability of RTP temperature measurement by pyrometry depend strongly on the wafer emissivity. In practice, frequent pyrometry sensor calibrations are required in order to obtain acceptable process repeatability. These frequent cross-calibrations are usually performed by placing separate standard calibration wafers with bonded thermocouples (TC-bonded wafers) in the process chamber, as shown in FIG. 1. The TC-bonded calibration wafers are placed in the process chamber between a quartz window and a gas showerhead. However, the TC-bonded calibration wafers require external electrical connections to the TC wires. As a result, the calibration process needs manual loading and unloading of the TC-bonded wafer. This manual process is time consuming and is not suitable in a semiconductor device manufacturing environment due to its detrimental impact on equipment utilization. This problem is even more severe when TC-bonded wafers with multiple distributed thermocouples are required for calibration of multi-point pyrometry sensors housed in a multi-zone illuminator. In addition, thermocouple-assisted temperature calibrations are not suitable in reactive (e.g. oxidizing) ambients at higher temperatures (>950° C). This is due to the fact that the thermocouple junctions degrade rapidly under these conditions. Even under inert conditions, thermocouples have limited lifetime. Thus, TC-bonded wafers exhibit limited lifetime and can only be used for a limited number of manual calibration runs. TC-bonded wafers may also introduce calibration errors (of as much as 10° C. or larger) due to the localized temperature offset caused by thermal loading. Special bonding procedures are required to minimize the sources of calibration error. Commercial TC-Bonded wafers are available for temperature sensor calibrations; these TC-bonded wafers are, however, expensive. Finally, the manual thermocouple-assisted calibrations may introduce contaminants into the process chamber. This can reduce the device manufacturing yield, particularly in critical processes such as gate dielectric formation and epitaxial silicon growth.

OBJECTS OF THE INVENTION

It is therefore an object of the invention to provide a wireless calibration system.

Another object of the invention is providing a wireless calibration system having known precise and repeatable temperature calibration points based on constant physical parameters such that it requires no initial calibration.

A further object of the invention is providing a wireless calibration system that operates in automatic wafer handling process without any need for manual handling.

A further object of the invention is providing a wireless calibration system that operates in both inert and reactive ambients.

A further object of the invention is providing a wireless calibration system with an increased life span which can be used repeatedly for precise and repeatable temperature sensor calibrations.

SUMMARY OF THE INVENTION

Precise and repeatable calibration of wafer temperature sensors, such as pyrometry, has been a problem. Generally, and in one form of the invention, a device and method for calibrating at least one temperature sensor is described. A wafer is provided which has a first plurality of calibration islands. The islands are of a material which has a melting point in the range 150°–1150° C. The wireless device is operable to induce a step change in an output of each temperature sensor at a wafer temperature equal to said melting point during a ramped-temperature calibration process.

BRIEF DESCRIPTION OF THE DRAWINGS

In the drawings:

FIG. 5 is a cross-sectional diagram of a temperature calibration device with two different calibration elements according to the second preferred embodiment of the present invention;

FIG. 6a–c are cross-sectional diagrams of a temperature sensor calibration wafer according to the second preferred embodiment of the present invention in various states of fabrication;

FIG. 8 is a block diagram of a rapid thermal processor with a wireless temperature calibration system according to the invention;

Corresponding numerals and symbols in the different figures refer to corresponding parts unless otherwise indicated.

DETAILED DESCRIPTION OF PREFERRED EMBODIMENTS

Figure 1:
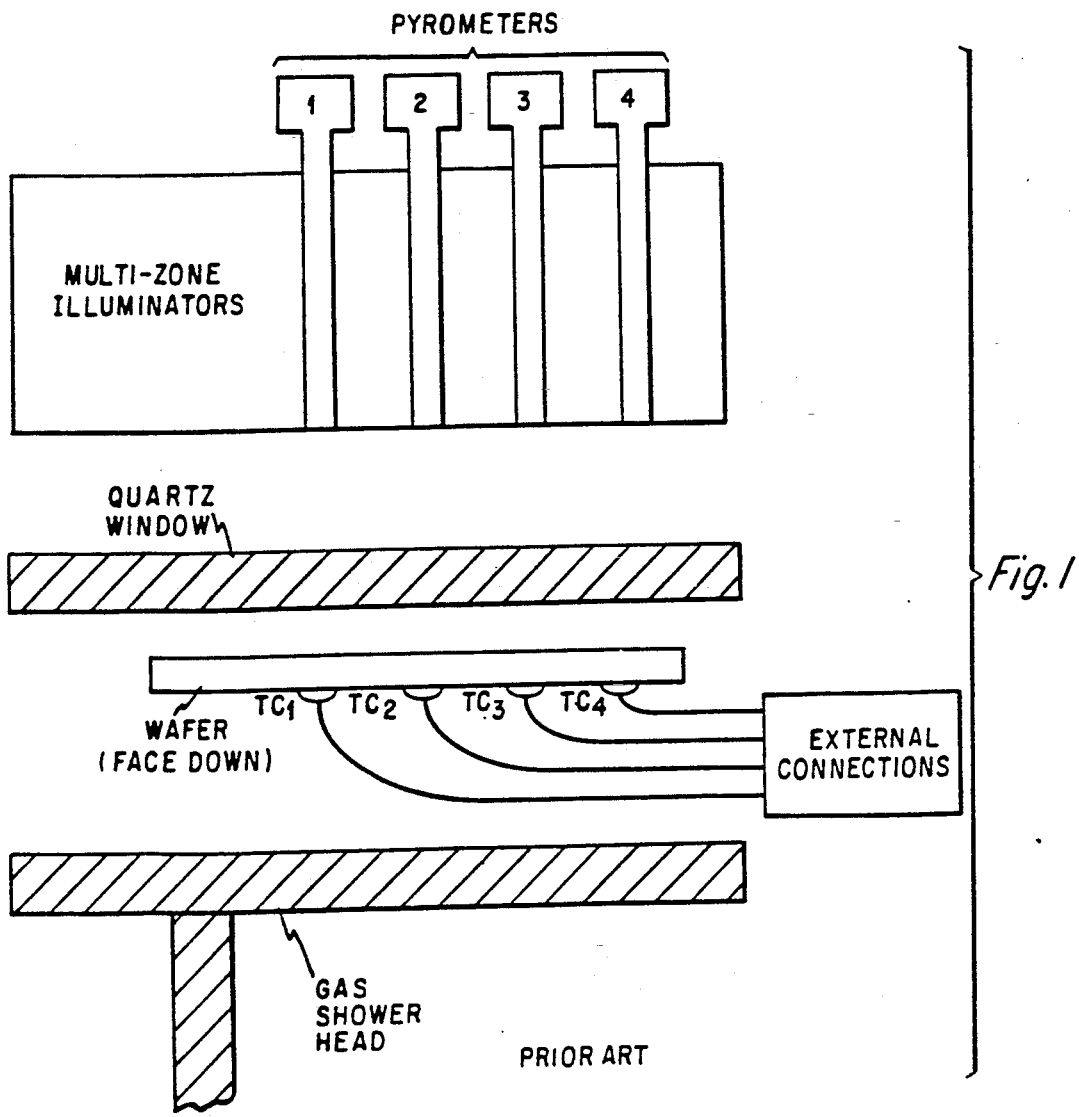
FIG. 1 is a block diagram of a prior art TC-bonded wafer calibration system shown in conjunction with a multi-zone rapid thermal processing system.

The preferred embodiments of the invention will be described with reference to a rapid thermal processing (RTP) reactor using pyrometry sensors for wafer temperature measurement, such as that shown in FIG. 1. The invention may alternatively be used with other device fabrication equipment and temperature measurement techniques, such as thermal expansion-based temperature sensors, acoustical sensors, and ellipsometry-based sensors. Typical processes which require precise temperature measurement and control include chemical-vapor deposition (CVD), thermal oxidation, and thermal anneals. However, the invention is not limited in application to semiconductor device fabrication processes. For example, it may also be used in conjunction with flat panel display (FPD) fabrication processes.

In contrast to prior art devices, the calibration wafers of the present invention have no thermocouples (TC's) and do not require any initial calibration against TC-bonded wafers before their use for precise pyrometry calibrations (or calibrations of other temperature sensors). The calibration wafer of this invention offers known precise temperature calibration standard points based on constant physical parameters. Because there are no thermocouples, the calibration wafers are wireless. Thus, they allow automated wafer handling for the calibration process. No manual wafer handling inside an automated processing reactor is needed. This feature makes the calibration standard of this invention compatible with product manufacturing environments. Furthermore, the calibration wafers of this invention can be used repeatedly for numerous temperature calibrations both in inert and reactive (e.g. oxidizing and nitridizing) ambients. These wafers are expected to last for many more calibration runs compared to the conventional TC-bonded wafers.

The invention can be implemented both on dedicated standard calibration wafers or on actual device wafers. For the latter, the temperature calibration elements are placed on the wafer backsides so that each device wafer serves as its own calibration standard as well. In the former, the calibration elements may be placed either on the wafer frontside (polished side) or on its backside.

This invention allows placement of one or two (or even multiple) calibration element types on each wafer. Each calibration element type is associated with a single known precise temperature. Two calibration temperature points ($T_1$ and $T_2$) are sufficient in order to calibrate pyrometry sensors in their operating temperature range for both gain and offset as will be discussed below. In this invention, melting points of suitable elements are used as the calibration temperature points. The melting points of pure elements and alloys of two (or more) elements with known ratios are physical constants which can be used for sensor calibration purposes when solid-to-melt phase transitions occur during a thermal cycle. These phase transitions can be detected in real time by noncontact means as will now be explained.

It is a known that various material elements demonstrate abrupt changes in their physical characteristics such as optical reflectance during the solid-to-melt phase transition at the melting point. For instance, surface optical reflectance of germanium (Ge) shows a step change (increase) when a transition from solid to melt occurs at the melting point ($Tm=937.4°$ for Ge). Other material properties such as electrical resistivity and microwave reflectance may also show abrupt step changes at the material melting point. The preferred material property used for the purpose of this invention is the optical reflectance or emissivity of the wafer at the melting points of the materials used and the abrupt changes associated with it.

Figure 2:
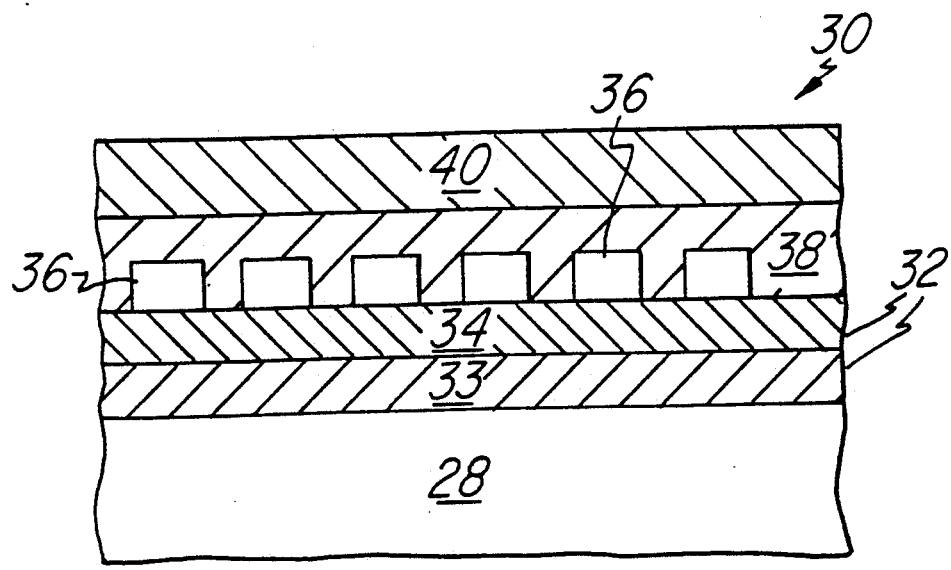
FIG. 2 is a cross-sectional diagram of a temperature calibration wafer according to the first preferred embodiment of the present invention.

A cross-section of the first preferred embodiment of the invention is shown in FIG. 2. Wafer 30 contains a buffer layer structure 32 located adjacent substrate 28 either on the frontside or the backside of wafer 30 (frontside is the preferred choice). Islands 36 of calibration material (e.g. germanium) are fabricated adjacent buffer layer structure 32. Buffer layer structure 32 may, for example, consist of both an oxide layer 33 and a nitride layer 34 to prevent the calibration material of islands 36 from reacting with the substrate during thermal calibration runs. Encapsulation layer 38 covers and isolates calibration islands 36. Since islands 36 will melt and solidify during calibration, encapsulation layer 38 seals each island 36 to contain the calibration elements 36. Finally, passivation layer 40 (such as silicon nitride) is located adjacent encapsulation layer 38. Passivation layer 40 prevents degradation of islands 36 in reactive environments such as oxygen.

Figure 3A:
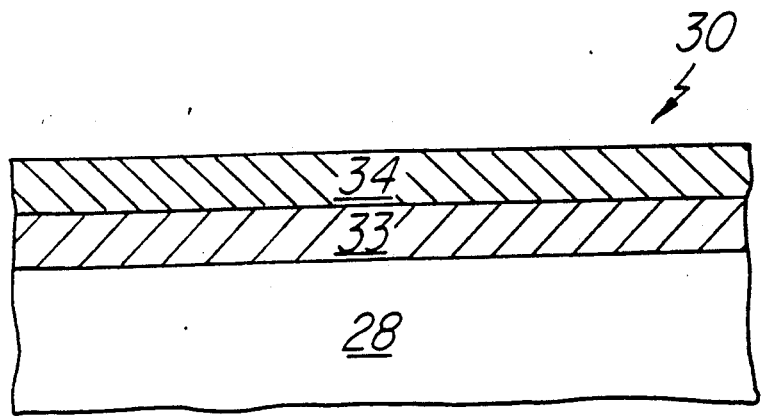
FIG. 3a–d are cross-sectional diagrams of a temperature calibration wafer according to the first preferred embodiment of the present invention in various states of device fabrication.

The process for forming the first preferred embodiment will now be described with reference to FIGS. 3a through d. As shown in FIG. 3a, initial buffer barrier layers 33, 34 are deposited over the substrate 28 of wafer 30. The buffer structure may consist of an initial layer of silicon dioxide 33 and a top layer of silicon nitride 34. Silicon dioxide layer 33 may, for example, have thickness of approximately 1000 Å and may be formed by low pressure chemical-vapor deposition (LPCVD). As will be apparent to those skilled in the art, other methods such as plasma-enhanced chemical-vapor deposition (PECVD), or thermal oxidation may alternatively be used. Silicon nitride layer 34 may also have a thickness of approximately 1000 Å and may be formed by LPCVD. Again, as will be apparent to those skilled in the art, other methods such as PECVD may alternatively be used. The buffer structure may also be made of other suitable material layers such as refractory metals.

Figure 3B:
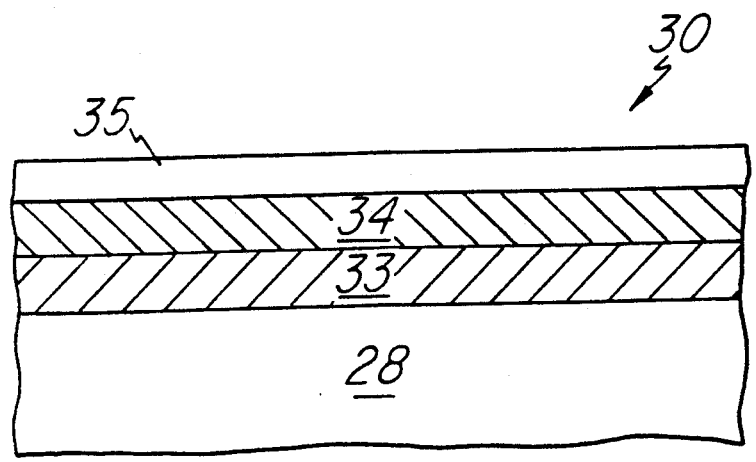

Next, as shown in FIG. 3b, a thin layer of the desired calibration material 35, such as germanium (Ge) is deposited. The melting point, $T_{m1}$, for Ge is 937.2° C. Deposition may be accomplished by various techniques such as CVD or physical-vapor deposition (PVD) such as sputtering. Calibration layer 35 has a thickness in the range of 200 and 3000 Å and is typically around 2000 Å. Calibration materials are chosen by three criteria. First, the melting points must be in the temperature range of interest. Typically, this is between 150° and 1150° C. Second, high boiling points and low vapor pressures are required to prevent contamination and stress-induced peeling of the encapsulation layers and to allow numerous calibration runs. Finally, the calibration material must comprise suitable elements or alloys which are compatible with silicon processing technology to prevent reactor contamination. Table 1 shows some examples of preferred materials for the purpose of this invention.

TABLE 1

| Element/Alloy | Melting Temp. (°C.) | Boiling Temp. (°C.) | Solid Density (g/cm³) | Melting Density (g/cm³) |
|---|---|---|---|---|
| Aluminum (Al) | 660.37 | 2467 | 2.6989 | 2.370 |
| Bismuth (Bi) | 271.3 | 1560 | | 10.05 |
| Germanium (Ge) | 937.4 | 2830 | 5.323 | 5.57 |
| Indium (In) | 156.61 | 2080 | 7.31 | 7.01 |
| Tin (Sn) | 231.97 | 2270 | 7.31 | 6.98 |
| 10% Al + 90% Sn | 540.0 | | | |

Figure 3C:
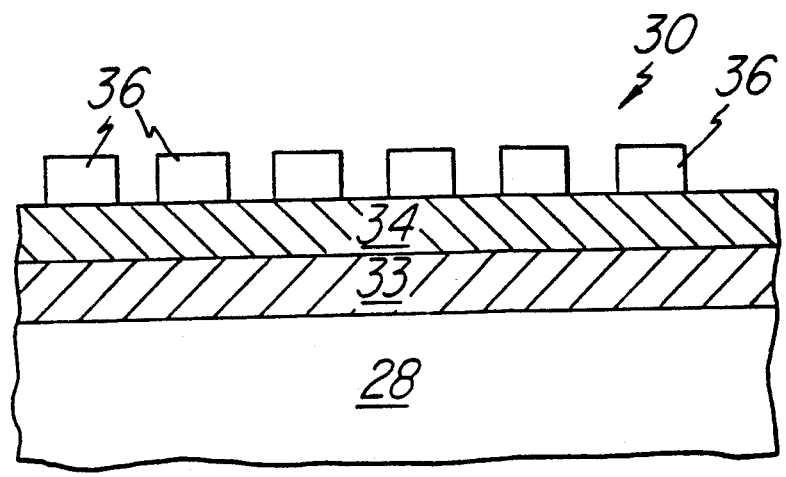
Figure 4:
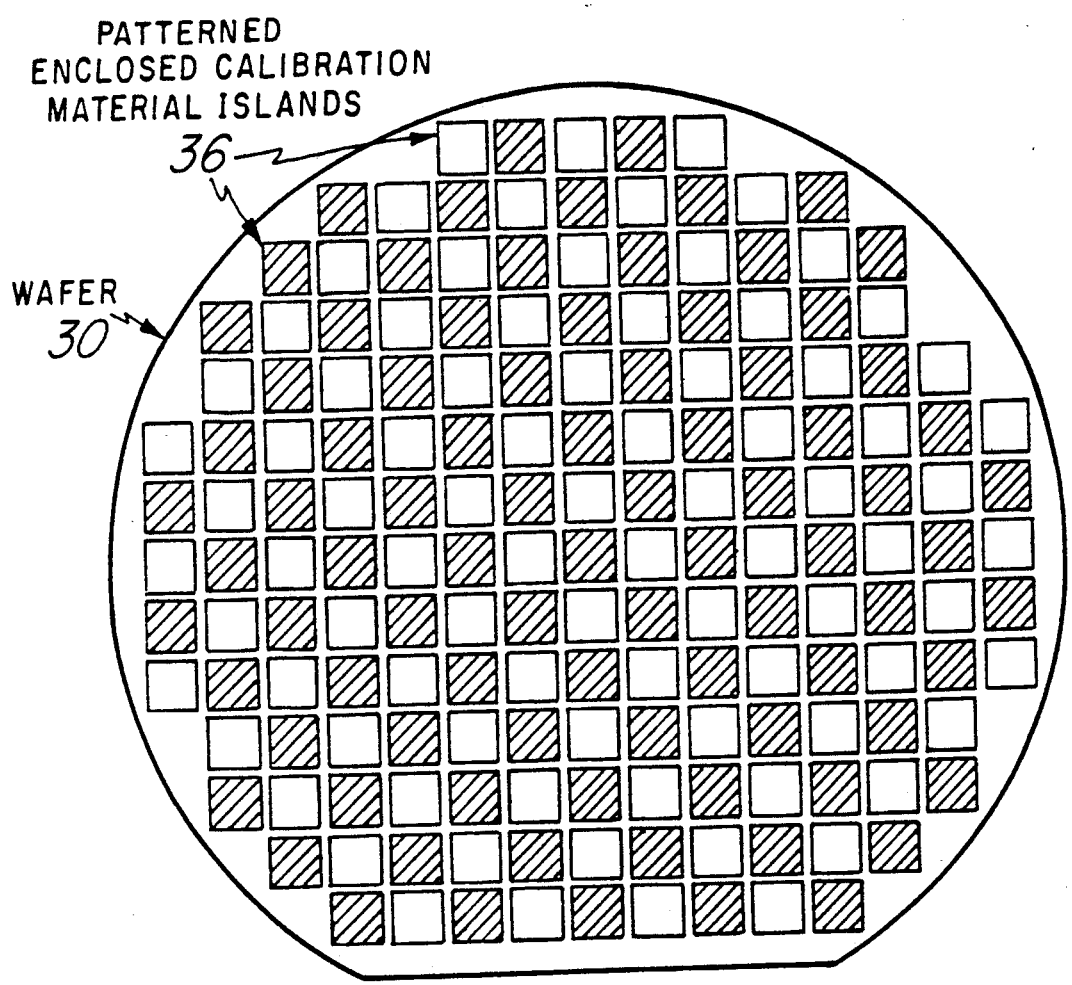
FIG. 4 is a top view of a temperature calibration device with two different, calibration elements according to the second preferred embodiment of the present invention.

Calibration layer 35 is then patterned via microlithography and plasma etch (or wet etch) to forman array of Ge islands 36, as shown in FIG. 3c. It is preferred that the islands 36 cover all of the wafer surface as shown in FIG. 4. However, they may alternatively only cover a portion of the wafer surface. The typical dimensions of the Ge islands are 25 μm×25 μm (gaps of 2.5 μm between adjacent islands). Larger or smaller dimensions may also be used. FIG. 4 shows islands 36 as square, but other shapes such as hexagons may of course alternatively be used. The Ge patterning etch may be performed in chlorine-containing (e.g. $Cl_2$) or fluorine-containing (e.g. $SF_6$) plasmas.

Figure 3D:
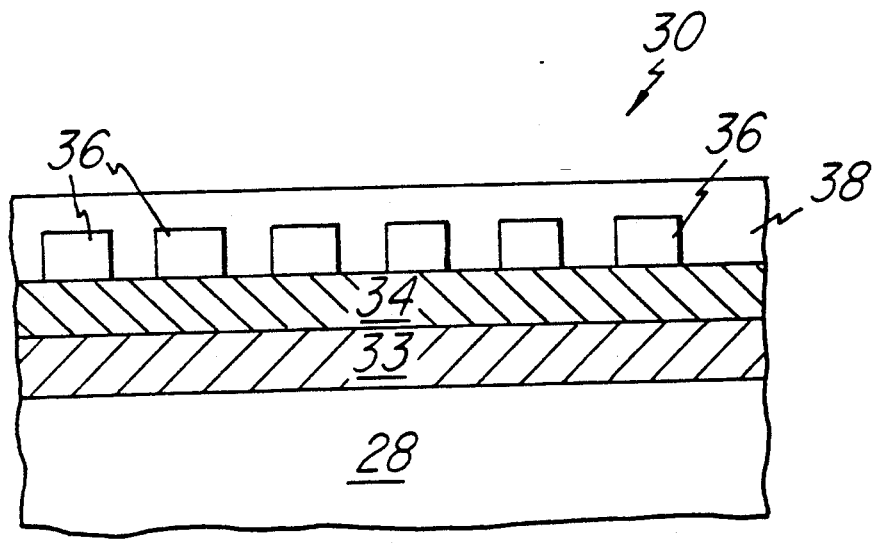

An encapsulation layer 38 of $SiO_2$ (or silicon nitride) is deposited via LPCVD or PECVD, as shown in FIG. 3d. Those skilled in the art will recognize that other methods such as sputtering may also be used. A typical encapsulation layer thickness is 1000 Å.

Finally, the passivation layer 40 is deposited. Passivation layer 40 may consist silicon nitride approximately 1000 Å thick and may, for example, be deposited by PECVD. Passivation layer 40 will prevent oxidation of the calibration elements during calibration runs in reactive oxidizing ambients. The resultant structure is shown in FIG. 2.

A cross-section of the second preferred embodiment of the invention is shown in FIG. 5. Wafer 30 contains a stacked buffer layer 32 (or a single buffer layer) located adjacent substrate 28 and may be on either the frontside or the backside of wafer 30 (frontside placement is preferred). Islands of a first calibration material 36 are located adjacent buffer layer 32. Buffer layer 32 may, for example, consists of both an oxide layer and a nitride layer to prevent the calibration material of islands 36 from reacting with the substrate during thermal calibration. Encapsulation layer 38 covers and isolates islands 36. Islands of second calibration material 46 are located above encapsulation layer 38. Encapsulation layer, 48 seals the islands of second calibration material 46. Finally, passivation layer 40 is located adjacent encapsulation layer 48. Passivation layer 40 (silicon nitride) prevents degradation of islands 36 and 46 in reactive environments such as oxidation. A single layer of silicon nitride may be used for both encapsulation and passivation.

The process for forming the second preferred embodiment will now be described with reference to FIG. 6a through c. FIG. 6a is a cross-sectional diagram of wafer 30 having buffer layers 33, and 34, first calibration islands 36 and encapsulation layer 38. These layers are formed in the same manner as described with respect to the first preferred embodiment.

As shown in FIG. 6b, a thin layer (e.g., 1000 Å) of second calibration material 45 is deposited above encapsulation layer 38. This may be accomplished using CVD or PVD for example. Second calibration material may for example consist of tin. Preferred choices for first and second calibration material include germanium and tin, germanium and aluminum, or aluminum and tin, for example. For tin and germanium (Sn, Ge), $T_{m1}$ is approximately 237° C. and $T_{m2}$ is approximately 937° C. This combination is good for sensor calibrations over an extended temperature range without contamination problems (e.g. for applications such as rapid thermal oxidation, rapid thermal anneal, etc.). Both germanium and tin are column IV semiconductors and are not considered contaminants in silicon. Aluminum and germanium is a preferred combination when $T_{m1} > 400°$ is required for pyrometry signal calibrations. This is due to the fact that some pyrometry sensors do not provide sufficient signal levels for temperatures less than 400° C. Tin and aluminum provide a $T_{m1}$ approximately equal to 232° C. and $T_{m2}$ approximately 660° C. This combination is useful for wireless calibrations in low-temperature processes. Examples include silicide react/anneal processes which are in the temperature range of 550°–750° C.

After the second calibration material is deposited, a second patterning step is performed to forman array of second calibration material islands 46, as shown in FIG. 6c. Islands 46 may have the same dimension as first islands 36. The pattern of islands 46 is such that it will not cause shadowing of the first calibration elements. This will ensure that the average local reflectance/emissivity of the wafer at any point is determined by the reflectivities of both calibration elements.

Finally, as shown in FIG. 5, a second encapsulation layer 50 and the passivation layer 40 are deposited. Second encapsulation layer 50 may consist of $SiO_2$ at a thickness of approximately 1000 Å. Passivation layer 40 may consist of silicon nitride approximately 1000 Å thick. Both layers may be deposited by, for example, PECVD. Passivation layer 40 will prevent oxidation of the calibration elements during calibration runs in oxidizing ambients. A single top layer of silicon nitride may be used for both encapsulation and passivation purposes.

Figure 7:
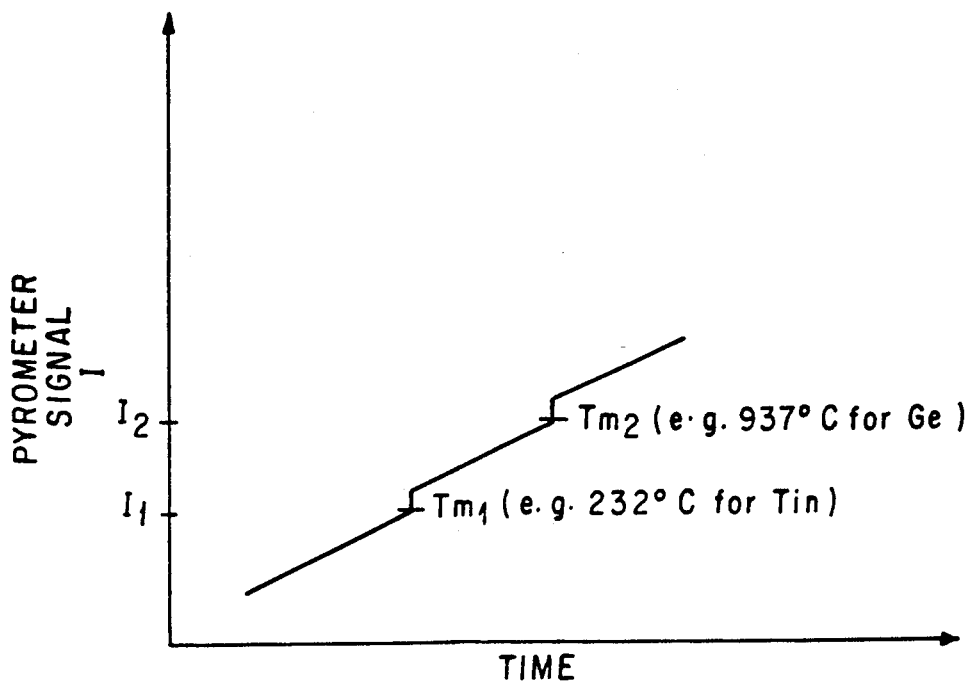
FIG. 7 is a graph of spectral radiance output of the temperature sensor calibration wafers versus time during a slow temperature/power ramp in a thermal processing chamber.

The first and second preferred embodiments can be used for wireless temperature calibration runs for both single point and multi-point pyrometry sensors of a RTP reactor. In operation, the calibration points $T_{m1}$ and $T_{m2}$ can be detected by one of several methods. The preferred method of detecting $T_{m1}$ and $T_{m2}$ calibration points is directly via the pyrometry signal or signals. As the wafer temperature is raised (or ramped) above $T_{m2}$ (or $T_{m1}$), a step change in wafer reflectance will result in a step change in its effective emissivity and the resultant pyrometry signal(s) will also experience a small step change, as shown in FIG. 7. Assuming a slow temperature/power ramp (change or temperature variation e.g., during an open-loop power ramp-up):

$$T = \alpha I + \beta \tag{1}$$

Where,

I is the linealized pyrometer output current or voltage;
T is the calibrated wafer temperature;
α is the slope or linear coefficient; and
β is the offset.

If one calibration material is used, as in the first preferred embodiment, $T_{m1}$ and $I_1$ are determined. Since the slope will generally be known from a separate thermocouple calibration run, the offset can be calculated as follows:

$$\beta = T_{m1} - \alpha I_1 \qquad (2)$$

If two or more calibration materials are used, both the slope and offset can be calculated because $T_{m1}$ and $I_1$ as well as $T_{m2}$ and $I_2$ will be known.

$$T_{m1} = \alpha I_1 + \beta \qquad (3)$$

$$T_{m2} = \alpha I_2 + \beta \qquad (4)$$

$$T_{m2} - T_{m1} = \alpha (I_2 - I_1) \qquad (5)$$

$$\alpha = \frac{T_{m2} - T_{m1}}{I_2 - I_1} \qquad (6)$$

$$\beta = \frac{T_{m1} I_2 - T_{m2} I_1}{I_2 - I_1} \qquad (7)$$

$$T = \left( \frac{T_{m2} - T_{m1}}{I_2 - I_1} \right) I + \left( \frac{T_{m1} I_2 - T_{m2} I_1}{I_2 - I_1} \right) \qquad (8)$$

The wireless calibration wafer usually has the same backside emissivity as the actual device wafers (although the requirement is not critical if the pyrometry system also employs emissivity compensation). In a multi-point pyrometry sensor system, the same wireless calibration wafer can be used for simultaneous calibrations of all the pyrometry sensors A distinct ($I_{i1}$, $T_{m1}$) and ($I_{i2}$, $T_{m2}$) will be determined for each sensor and a separate slope (gain) and offset can then be calculated for each sensor.

Figure 9:
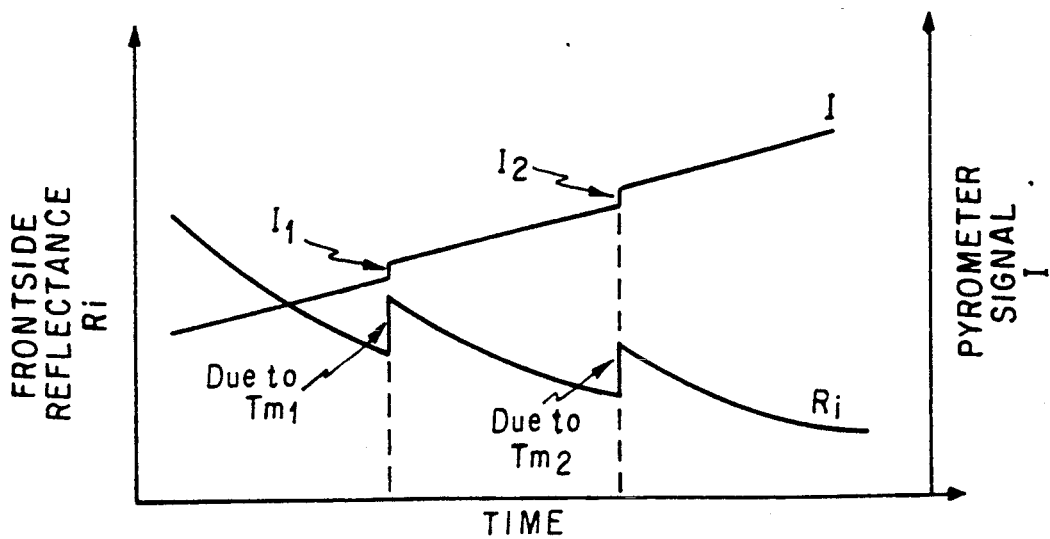
FIG. 9 is a qualitative graph of both the output radiance of the temperature sensor calibration wafer versus time and the calibration wafer reflectance values versus time during a slow temperature/power ramp.

An alternative method to detect $T_{m1}$ and $T_{m2}$ transitions for pyrometry calibrations (rather than trying to detect the small pyrometry signal step changes) is to use laser beams 118 from the frontside (or even backside) to monitor the surface reflectivity values, as shown in FIG. 8. A laser beam 118 is directed at wafer 112 across from each sensor 1-4. Sensors 1-4 are located within the multi-zone illuminator of the RTP reactor and separated from wafer 112 by quartz window 110. On the other side of wafer 112 is gas showerhead 114. In the preferred embodiment, sensors 1-4 are pyrometers. However, it will be apparent to those skilled in the art that sensors 1-4 may alternatively be elipsometers, thermal expansion sensors, or acoustical sensors. The laser may be a cheap HeNe (6328 Å) laser with fiber-optic coupling 120 for improved alignment. The reflectance values $R_1 - R_4$ are monitored during a calibration cycle power ramp using detectors 116. The surface reflectance values measured during a calibration cycle will experience step changes at times corresponding to ($I_{i1}$, $T_{m1}$) and ($I_{i2}$, $T_{m2}$), as shown in FIG. 9. Accordingly, $T_{m1}$ and $I_1$ and $T_{m2}$ and $I_2$ are determined and the above calculations for slope (gain) and offset apply.

Figure 10:
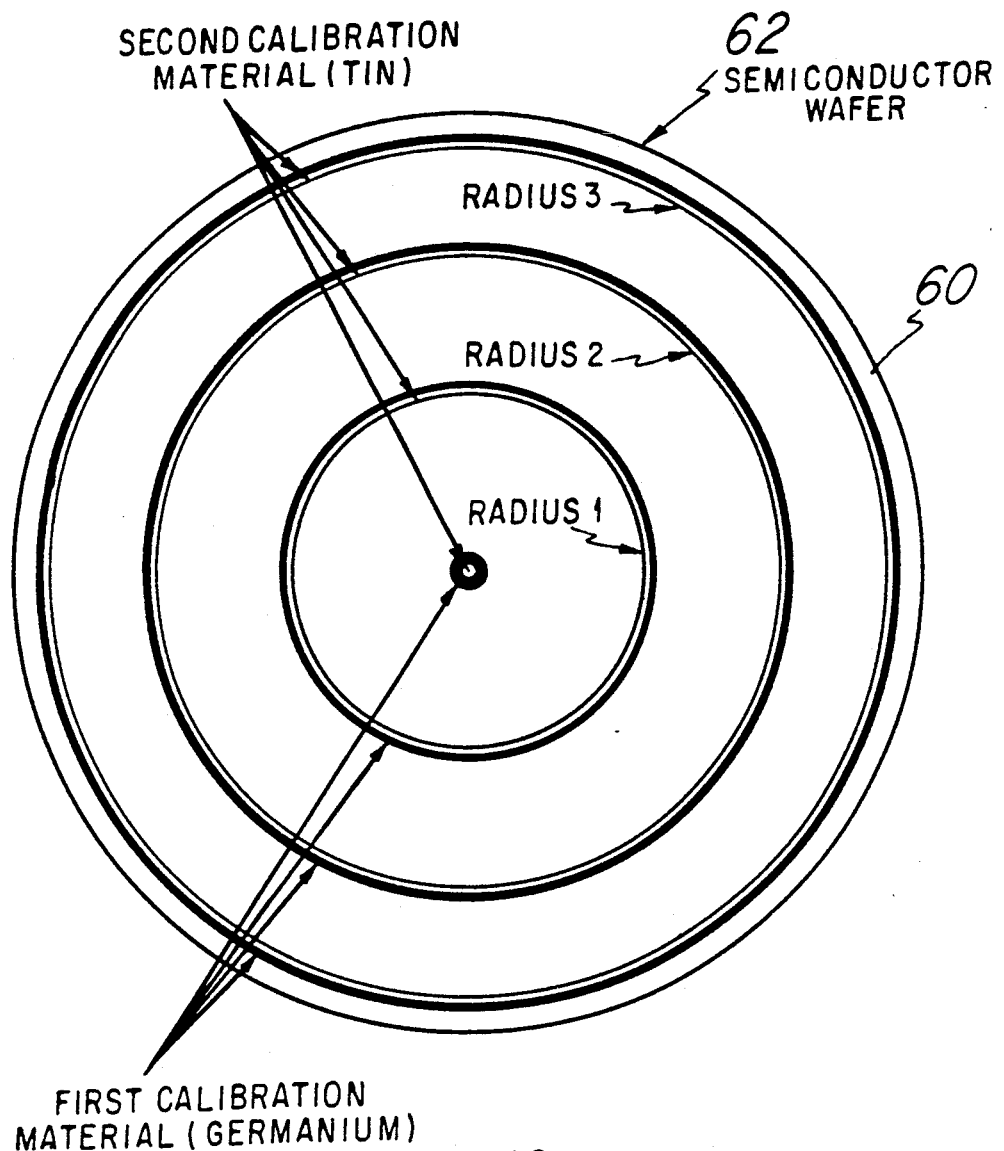
FIG. 10 is a top view of a wireless temperature calibration wafer according to a third preferred embodiment of the invention.

A third preferred embodiment of the invention is shown in FIG. 10. This figure shows formation of the calibration elements on narrow rings 60 on the backside of wafer 62. The rings may have a typical width of 2 mm or less and are located at radial positions corresponding to the radial probe positions of the multi-point pyrometry sensors. The rings may consist of one or more calibration materials. Any of the two detection methods for ($I_{i1}$, $T_{m1}$) and ($I_{i2}$, $T_{m2}$), direct pyrometry step detection or laser reflectance, can be used. In this case, the HeNe laser probes can be placed into the illuminator light pipes to look at the specific radial positions on the wafer backside (similar structure as the pyrometer light pipes).

Figure 11A:
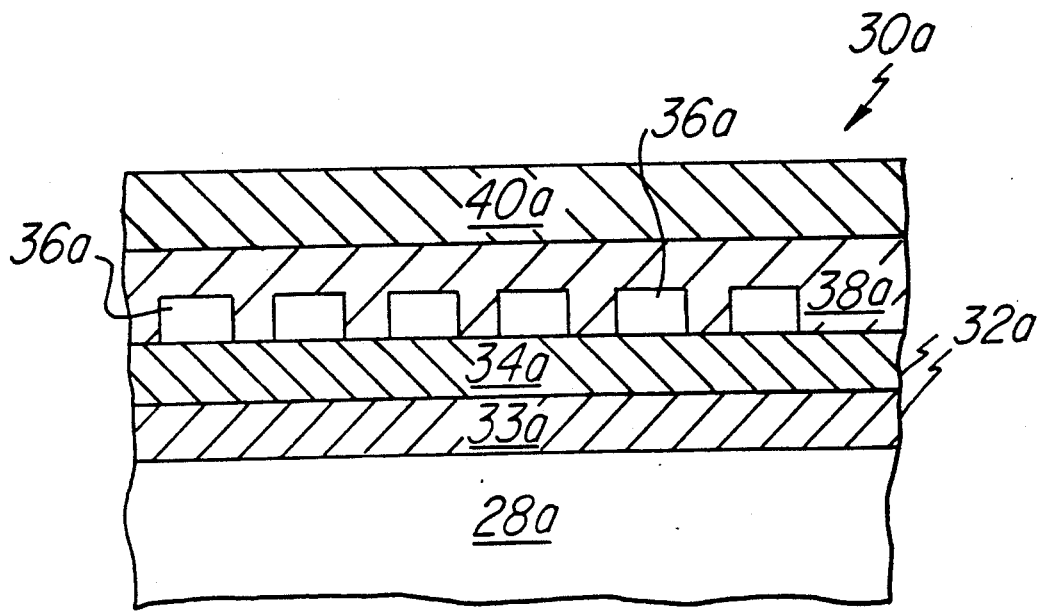
FIGS. 11a–b are cross-sectional diagrams of the fourth preferred embodiment of the invention.
Figure 11B:
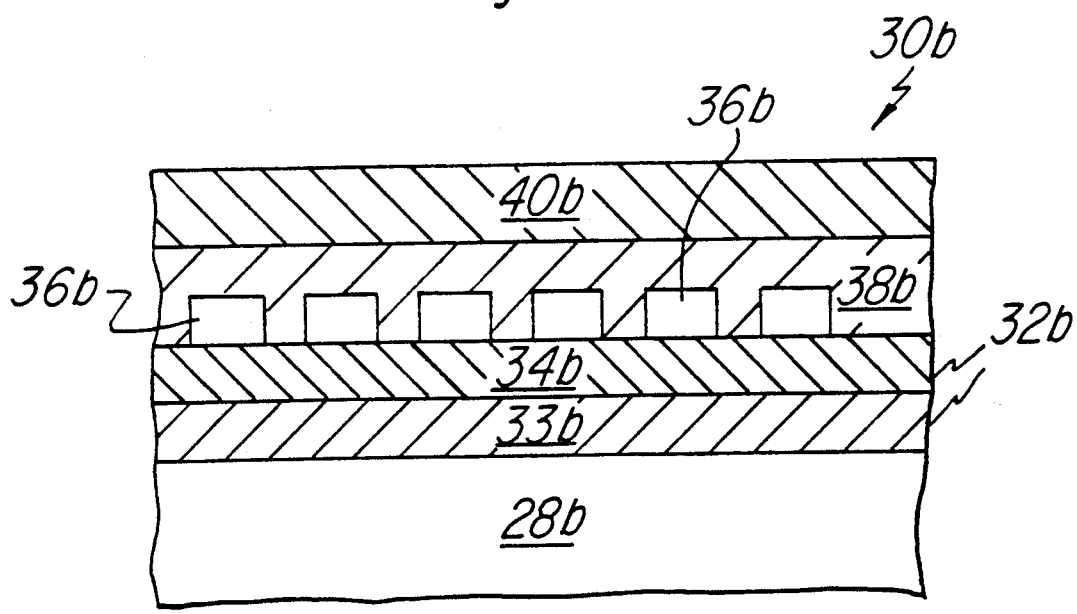

Referring to FIGS. 11a-b, a fourth preferred embodiment involves the use of two separate wireless calibration wafers. Both wafers 30A and 30B may be formed as described above relative to the first preferred embodiment and shown in FIG. 2. Calibration islands 36A and 36B are located within encapsulation layers 38A and 38B, respectively. Encapsulation layers 38A and 38B are separated from substrate 28A and 28B by buffer layer 32A and 32B, respectively. Passivation layers 40A and 40B cover wafers 30A and 30B respectively. However, each wafer will have a different calibration material. In operation, $I_{i1}$ and $T_{m1}$ are determined using the first wafer by either of the two detection method described above. $I_{i2}$ and $T_{m2}$ are determined using the second wafer. Once ($I_{i1}$, $T_{m1}$) and ($I_{i2}$, $T_{m2}$) are known, the slope and offset can be calculated according to equations (6) and (7).

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for calibrating at least one temperature sensor comprising the steps of:
   providing a wafer having at least one plurality of calibration structures of a material having a melting point in the range of 150° to 1150° C., wherein said at least one temperature sensor is operable to detect a temperature dependent characteristic of said wafer and output a signal corresponding to said temperature depending characteristic;
   selectively varying a power input and ramping the wafer temperature to said temperature depending characteristic;
   selectively varying a power input and ramping the wafer temperature for a calibration run;
   directing at least one light beam at the wafer;
   monitoring the wafer surface reflectance at the point at which each light beam is directed during the step of ramping the wafer temperature;
   detecting a first step change in the wafer surface reflectance corresponding to a wafer temperature equal to the melting point of said calibration structures;

determining a first set of sensor parameters corresponding to said first step change; and calculating a set of calibration parameters for each temperature sensor being calibrated.

2. The method of claim 1 wherein said wafer has a first and second plurality of calibration structures, each of said pluralities comprising a different material having a melting point in the range 150° to 1150° C.

3. The method of claim 2 further comprising the step of detecting a second step change in the wafer surface reflectance corresponding to a wafer temperature equal to the melting point of said second calibration structure and determining a second set of sensor parameters corresponding to said second step change.

4. The method of claim 1, wherein said first set of sensor parameters comprises current levels.

5. The method of claim 1 wherein said at least one temperature sensor comprises a pyrometer.

6. The method of claim 1 wherein said temperature dependent characteristic is wafer radiance.

7. The method of claim 1 wherein said temperature dependent characteristic is wafer emissivity.

8. A method for calibrating at least one temperature sensor comprising the steps of:
providing a wafer having a first plurality of calibration islands of a material having a melting point in the range 150° to 1150° C.;
selectively varying a power input and ramping the temperature of said wafer;
monitoring a wafer emissivity of the wafer with said at least one temperature sensor while said wafer temperature is being ramped;
detecting a first step change in said wafer emissivity corresponding to a wafer temperature equal to said melting point of said first calibration islands for each temperature sensor being calibrated;
calculating the calibration parameters for each temperature sensor being calibrated.

9. The method of claim 8 wherein said wafer also has a plurality of second calibration islands of a material different from said first calibration islands and having a melting point in the range 150° to 1150° C.

10. The method of claim 9 further comprising the step of detecting a second step change in said wafer emissivity corresponding to a wafer temperature equal to the melting point of said second calibration material for each temperature sensor being calibrated.

11. The method of claim 8, further comprising the steps of:
providing a second wafer having a second plurality of calibration islands of a second material having a melting point in the range 150° to 1150° C., wherein said second material is different from said first material;
slowly ramping the temperature of said second wafer;
monitoring said wafer emissivity of said second wafer in response to said increasing temperature for each temperature sensor; and
detecting a second step change in said wafer emissivity corresponding to a second wafer temperature equal to said melting point of said second calibration islands for each temperature sensor.

12. The method of claim 11 further comprising the steps of:
directing at least one light beam at said wafer; and
providing a detector for each light beam to detect wafer reflectivity, wherein said first and second step changes are detected in an output signal of said detector.

13. A method for calibrating at least one temperature sensor comprising the steps of:
providing a wafer having a first plurality of calibration islands of a material having a melting point in the range 150° to 1150° C.;
selectively varying a power input and ramping the temperature of said wafer;
monitoring a wafer radiance of the wafer with said at least one temperature sensor while said wafer temperature is being ramped;
detecting a first step change in said wafer radiance corresponding to a wafer temperature equal to said melting point of said first calibration islands for each temperature sensor being calibrated;
calculating the calibration parameters for each temperature sensor being calibrated.

14. The method of claim 13 wherein said wafer also has a plurality of second calibration islands of a material different from said first calibration islands and having a melting point in the range 150° to 1150° C.

15. The method of claim 14 further comprising the step of detecting a second step change in said wafer radiance corresponding to a wafer temperature equal to the melting point of said second calibration material for each temperature sensor being calibrated.

16. The method of claim 13, further comprising the steps of:
providing a second wafer having a second plurality of calibration islands of a second material having a melting point in the range 150° to 1150° C., wherein said second material is different from said first material;
slowly ramping the temperature of said second wafer;
monitoring said wafer radiance of said second wafer in response to said increasing temperature for each temperature sensor; and
detecting a second step change in said wafer radiance corresponding to a second wafer temperature equal to said melting point of said second calibration islands for each temperature sensor.

17. The method of claim 16 further comprising the steps of:
directing at least one light beam at said wafer; and
providing a detector for each light beam to detect wafer reflectivity, wherein said first and second step changes are detected in an output signal of said detector.

* * * * *